(12) United States Patent
Tsuji et al.

(10) Patent No.: US 7,431,507 B2
(45) Date of Patent: Oct. 7, 2008

(54) SLIDING MEMBER

(75) Inventors: Hideo Tsuji, Inuyama (JP); Masahito Fujita, Inuyama (JP); Naohisa Kawakami, Inuyama (JP); Koue Ohkawa, Inuyama (JP)

(73) Assignee: Daido Metal Company Ltd, Nagoya (JP)

( * ) Notice: Subject to any disclaimer, the term of this patent is extended or adjusted under 35 U.S.C. 154(b) by 694 days.

(21) Appl. No.: 10/862,359

(22) Filed: Jun. 8, 2004

(65) Prior Publication Data

US 2004/0264820 A1 Dec. 30, 2004

(30) Foreign Application Priority Data

Jun. 30, 2003 (JP) ............................. 2003-187727

(51) Int. Cl.
*F16C 33/12* (2006.01)

(52) U.S. Cl. .................. 384/276; 384/283; 384/907

(58) Field of Classification Search ............ 384/276, 384/282, 283, 284, 285, 907, 913
See application file for complete search history.

(56) References Cited

U.S. PATENT DOCUMENTS

| 4,400,099 A | 8/1983 | Ehrentraut |
| 4,561,787 A | 12/1985 | Ehrentraut et al. |
| 5,000,586 A | 3/1991 | Daxer et al. |
| 6,770,383 B2 | 8/2004 | Tanaka et al. |

FOREIGN PATENT DOCUMENTS

| AT | 369 145 | 6/1981 |
| DE | 82 06 353 U1 | 3/1982 |
| EP | 0 758 721 A1 | 2/1997 |
| EP | 1 092 885 A3 | 2/2004 |
| GB | 2 216 199 A | 10/1989 |
| GB | 2 256 903 A | 12/1992 |
| JP | 57-144313 | 6/1982 |
| JP | 02142921 A | 6/1990 |
| JP | 06-280090 | 10/1994 |
| JP | 07-133825 | 5/1995 |
| JP | 2000-345389 | 12/2000 |
| JP | 2002-310158 | 10/2002 |

*Primary Examiner*—William C Joyce
(74) *Attorney, Agent, or Firm*—Browdy and Neimark, P.L.L.C.

(57) ABSTRACT

A sliding member has a sliding alloy layer, an intermediate layer of Ni or a Ni alloy formed on the sliding alloy layer, and a soft layer of Sn or a Sn alloy formed on the intermediate layer. A recess is formed on the sliding side surface of the sliding alloy layer. The intermediate layer is formed on the inner surface of the recess. The sliding member is subjected to a heat treatment, whereby there are formed intermetallic compounds in the soft layer, which extend protrudently from the intermediate layer.

15 Claims, 5 Drawing Sheets

SLIDING MEMBER

BACKGROUND OF THE INVENTION

Technical Field

The present invention relates to a sliding member in which a recess is formed on the sliding side surface of a sliding alloy layer, an intermediate layer is formed on inner surface of the recess, and a soft layer is formed on the intermediate layer.

There has been known a plain bearing, as a sliding member, having a structure in which a number of groove recesses extending circumferentially (in a direction of shaft rotation) are formed on the sliding side surface of a bearing alloy layer (a sliding alloy layer), an intermediate layer, as a barrier layer, made of a Ni-based material is formed in the recesses, and a soft layer is formed on the intermediate layer (see, for example, JP-A-57-144313). In this case, the soft layer is made of the white metal alloy or resin material.

In such a plain bearing with the structure described above, there are exposed, on the sliding surface of the bearing, the bearing alloy layer and the soft layer formed in the recesses. According to such a structure, the comparatively hard sliding alloy layer can bear a load and the comparatively soft layer can maintain good sliding properties, whereby attaining a structure excellent in load carrying capacity and wear resistance.

However, in the above conventional structure involves a problem that the soft layer in the recesses is liable to be lost due to occurrence of cavitation erosion.

SUMMARY OF THE INVENTION

The present invention was made under the above background, an object of which is to provide an above mentioned type sliding member, having such a recess formed on a sliding alloy layer at the sliding surface side thereof, which is excellent in cavitation resistance property.

Accordingly, there is provided a sliding member comprising a sliding alloy layer, an intermediate layer of Ni or a Ni alloy formed on the sliding alloy layer, and a soft layer of Sn or a Sn alloy formed on the intermediate layer, wherein there is formed a recess on the sliding side surface of the sliding alloy layer, and the intermediate layer is formed on the inner surface of the recess, and wherein there are formed intermetallic compounds in the soft layer, which extend protrudently from the intermediate layer.

Ni or the Ni alloy of the intermediate layer reacts with Sn or the Sn alloy of the soft layer to form intermetallic compounds. Since the compounds extend protrudently from the intermediate layer, which has good adhesion property to the sliding alloy layer, and have good adhesion property to the intermediate layer by virtue of elemental diffusion into the intermediate layer, they exhibit an anchoring effect to inhibit exfoliation of the soft layer. Consequently, even if cavitation erosion occurred, it is possible to prevent the soft layer from being exfoliated and lost from the sliding member, thus enabling enhancing cavitation resistance property.

In this case, it is possible to make the sliding surface to be of a state in which there are exposed at least the sliding alloy layer and the soft layer on the sliding surface of the sliding member. According to such a structure, the comparatively hard sliding alloy layer can bear a load and the comparatively soft layer can maintain good sliding properties, whereby attaining a structure excellent in load carrying capacity and wear resistance.

Preferably, the soft layer is made of a Sn alloy containing not more than 20 mass % Cu, optionally not more than 10 mass % Ag, and optionally not more than 15 mass % Sb.

Additive Cu in the soft layer contributes to improvement of mechanical strength of the soft layer and causes the protrudent Sn—Cu intermetallic compounds extending from the intermediate layer into the soft layer easily to be formed, whereby easily attaining the anchoring effect by virtue of the protrudent intermetallic compounds. Cosequently, the cavitation resistance property can be further improved.

An excessive amount of additive Cu makes the soft layer brittle to deteriorate cavitation resistance property, and the protrudent Sn—Cu intermetallic compounds too rich on the sliding surface to deteriorate anti-seizure property. Therefore, the Cu amount is preferably not more than 20 mass %, and more preferably 5 to 15 mass %.

Further, if Ag and Sb are added to the soft layer, the soft layer is improved in mechanical strength, whereby the cavitation resistance property can be further improved.

However, an excessive amount of Ag makes the soft layer brittle thereby deteriorating the cavitation resistance property, and various Sn based compounds too rich on the sliding surface thereby deteriorating anti-seizure property and embeddability for a foreign-substance. Therefore, the Ag amount is preferably not more than 10 mass %.

On the other hand, an excessive amount of Sb makes the soft layer brittle thereby deteriorating the cavitation resistance property, and various Sn based compounds too rich on the sliding surface thereby deteriorating anti-seizure property and embeddability for a foreign-substance. Therefore, the Sb amount is preferably not more than 15 mass %.

The recess formed on the sliding alloy layer preferably have a depth of 5 to 50 μm. In the case where the depth of the recess is too small, also the soft layer has a small thickness and there appear much amounts of the protrudent intermetallic compounds on the sliding surface to deteriorate anti-seizure property. Also, when the depth of the recess is too large, the soft layer supported by the protrudent intermetallic compounds is increased in quantity and the improvement effect of cavitation resistance is deteriorated. Therefore, the depth of the recess is preferably 5 to 50 μm, and more preferably 10 to 30 μm. It should be noted that the depth of the recess is not required to be constant all over the place but may vary according to places.

The intermediate layer may be made of only Ni, or a Ni alloy such as Ni—Sn, Ni—Mo, etc. Also, the intermediate layer may be of a double-layered structure composed of Ni and a Ni—Sn alloy, or Ni and a Ni—Mo alloy. A thickness of the intermediate layer depends upon a depth of the recess but is preferably 1 to 5 μm. When a thickness of the intermediate layer is too small, the protrudent intermetallic compounds extending from the intermediate layer is formed to be decreased in quantity and the anchoring effect is deteriorated. Also, when a thickness of the intermediate layer is too large, the intermediate layer on the sliding surface is increased in area and the protrudent intermetallic compounds are increased in quantity, so that anti-seizure property is deteriorated.

DETAILED DESCRIPTION OF THE INVENTION

An embodiment of the invention will be described below, and the advantageous effects of the invention will be made apparent by making a comparison between the invention and comparative specimens.

A plain bearing (corresponding to the sliding member) according to the invention is fabricated in the following manner. First, sintering or casting and rolling are used to provide a bearing alloy layer (sliding alloy layer) on a steel back sheet, and then machining is used to fabricate a plain bearing. In this case, a copper alloy (Cu-23Pb-3Sn) (by mass %) is used for the bearing alloy layer in the embodiment but an aluminum alloy will do.

Figure 1:
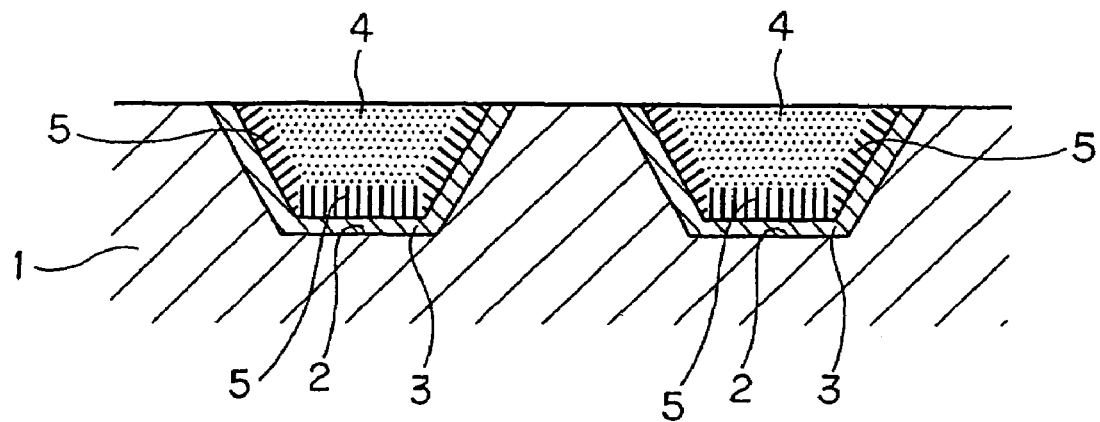
FIG. 1 is a cross sectional view showing an essential part of an embodiment of the invention.
Figure 2:
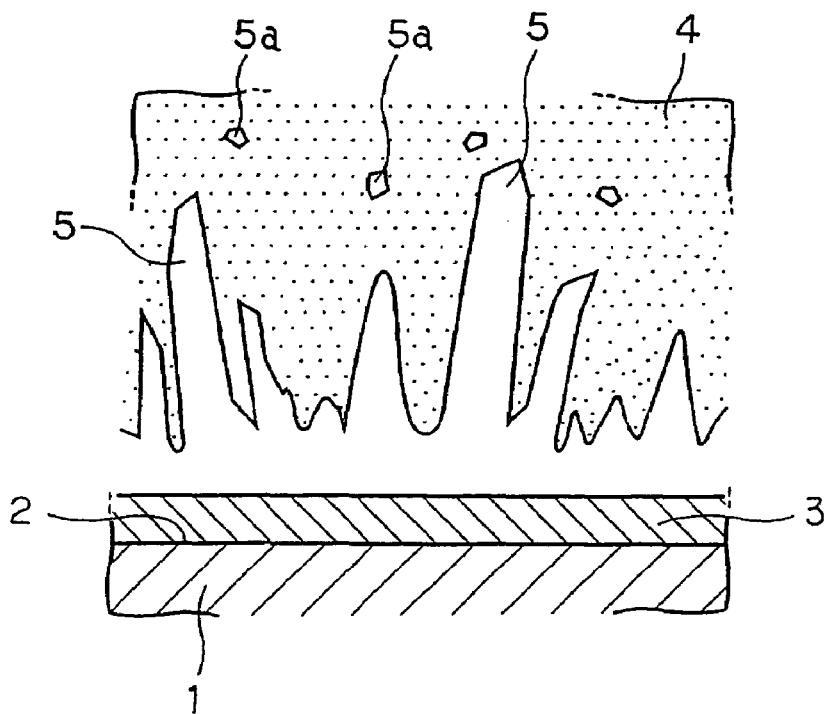
FIG. 2 is an enlarged, cross sectional view schematically showing the above essential part.
Figure 3:
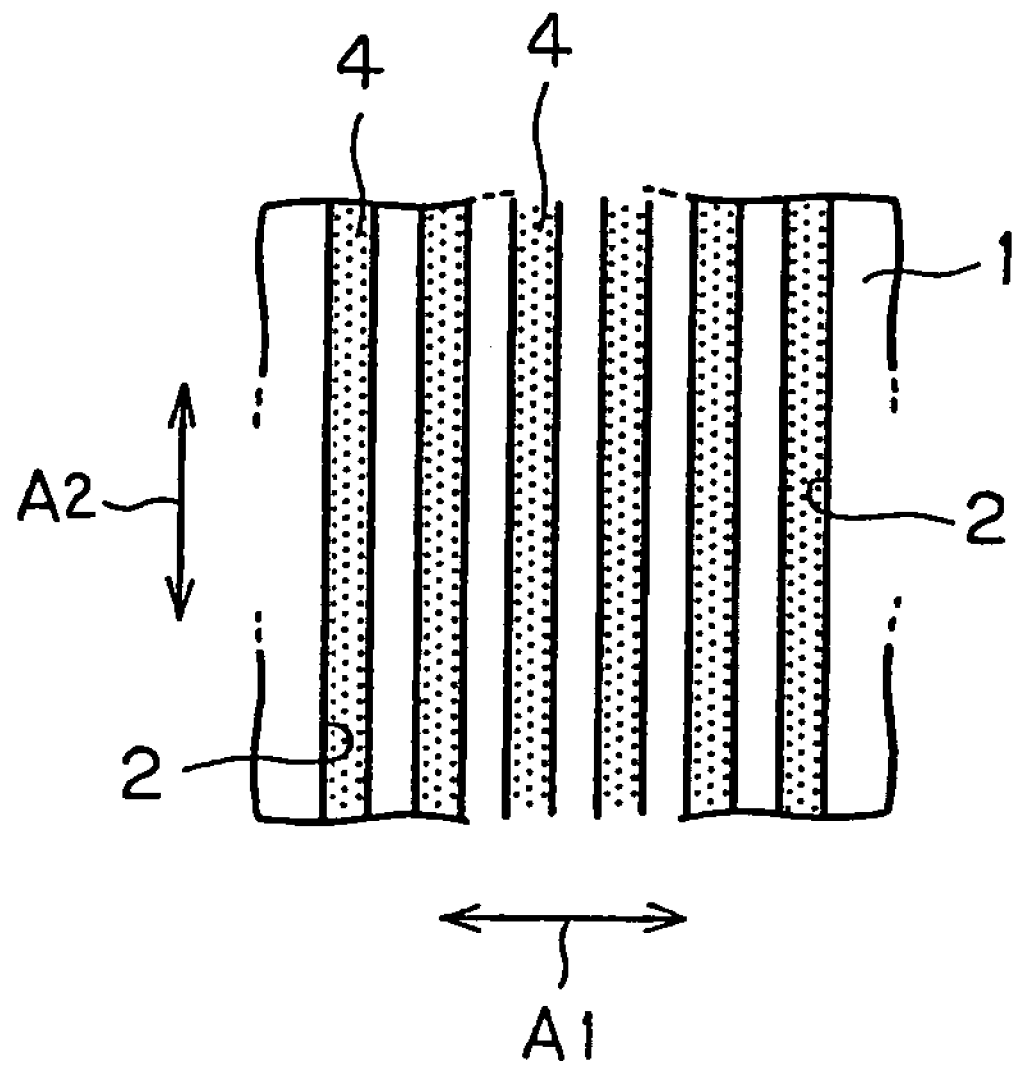
FIG. 3 is a plan view showing the essential part of the embodiment of the invention.

Subsequently, recesses 2 are formed on a sliding surface side (an upper surface side in the drawing) of the bearing alloy layer 1 as shown in FIG. 1. In this case, a number of groove recesses 2 are formed so as to extend in a direction (direction A2 of shaft rotation) intersecting an axial direction A1 of the plain bearing as shown in FIG. 3. While the recesses 2 are formed to be trapezoidal as shown in FIG. 1, they may be hemi-circular or V-shaped. The recesses 2 are formed by boring to have a predetermined depth (5 to 50 μm) when a surface of the bearing alloy layer 1 is subjected to machining. In addition, FIGS. 1 to 3 schematically show a state, in which a plain bearing is finished.

Next, electroplating is used to provide an intermediate layer 3 in the respective recesses 2 and on the surface of the bearing alloy layer 1. The intermediate layer 3 is made of Ni or a Ni alloy to have a thickness of 1 to 5 μm. Thereafter, electroplating is used to provide a soft layer 4 on the intermediate layer 3 in a manner to fill up the recesses 2. The soft layer 4 is made of pure Sn, or a Sn alloy containing Cu.

Next, heat treatment is performed. Conditions of the heat treatment in this case include 150° C.×5 Hr. Thereby, protrudent intermetallic compounds 5 (see FIG. 2) is formed between the intermediate layer 3 and the soft layer 4 to extend like columns from the intermediate layer 3 into the soft layer 4. In the case where the intermediate layer 3 is made of only Ni and the soft layer 4 is made of a Sn—Cu alloy containing Cu, the protrudent intermetallic compounds 5 is composed of an intermetallic compound of Sn—Cu—Ni and Sn—Cu. In FIG. 2, the reference numeral 5a denotes a Sn—Cu intermetallic compound that has not grown into the protrudent intermetallic compounds 5. In addition, in the case where the intermediate layer 3 is made of only Ni and the soft layer 4 is made of pure Sn, the protrudent intermetallic compounds 5 is composed of an intermetallic compound of Sn—Ni.

Figure 4A:
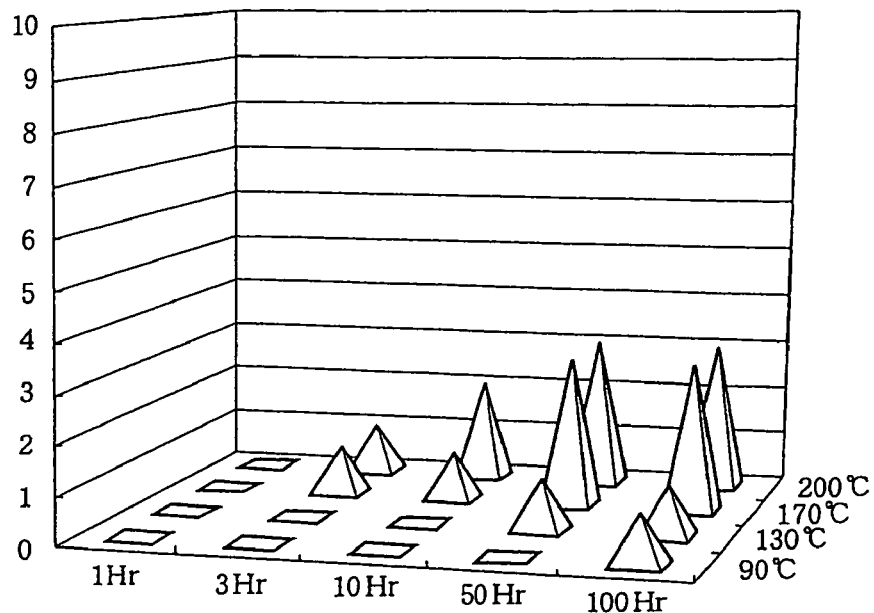
FIGS. 4A and 4B are views illustrating the relationship between conditions of heat treatment when protrudent intermetallic compounds are formed, and a height of the protrudent intermetallic compounds from an intermediate layer, FIG. 4A being a view showing the case where a Cu content in a soft layer is small, and FIG. 4B being a view showing the case where a Cu content in the soft layer is large.
Figure 4B:
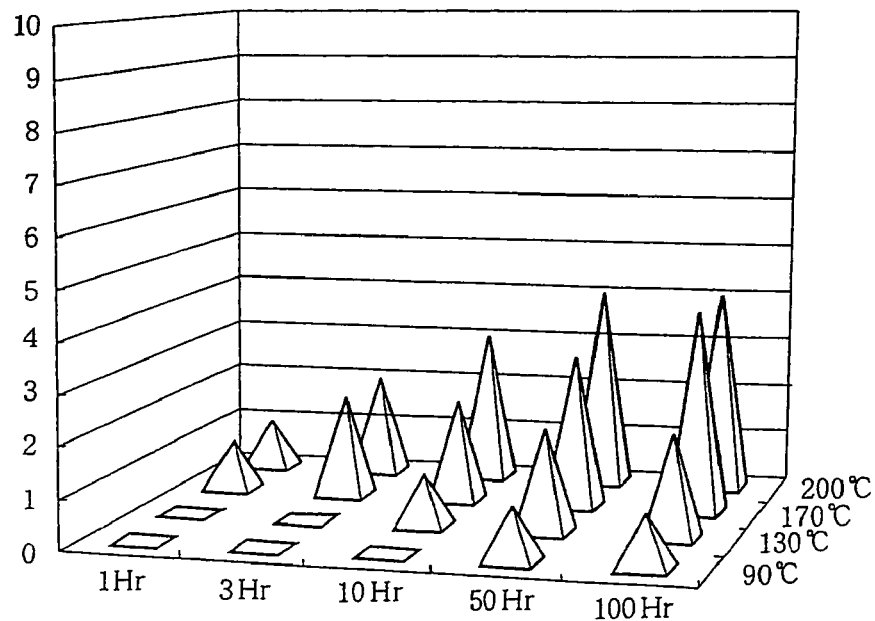

Hereupon, the present inventors have examined the formation condition of the protrudent intermetallic compounds and found the following matters. That is, it has been found that in order to facilitate formation of the protrudent intermetallic compounds, heat treatment at high temperatures, heat treatment over a long period of time, and the like are preferably performed and there is a relationship as shown in FIGS. 4A and 4B. FIG. 4A shows the case where the soft layer contains a small quantity of Cu (the soft layer (Sn-3Cu)/the intermediate layer (Ni)/the bearing alloy layer (Cu alloy)), and FIG. 4B shows the case where the soft layer contains a large quantity of Cu (the soft layer (Sn-10Cu)/the intermediate layer (Ni)/the bearing alloy layer (Cu alloy)) (by mass %).

It is seen in either of FIGS. 4A and 4B that the higher the heat treatment temperature and the longer the heat treatment time, the higher a height of the protrudent intermetallic compounds from the intermediate layer. Also, it is seen from a comparison between FIGS. 4A and 4B that even under the same condition of heat treatment, the larger a quantity of Cu in the soft layer (FIG. 4B), the higher a height of the protrudent intermetallic compounds.

On the basis of these results, the present inventors have found that formation of the protrudent intermetallic compounds can be promoted by increasing a quantity of Cu in the soft layer. Also, it has been found that when a quantity of Cu is increased in an area near to the intermediate layer, making the intermetallic compound protrudent can be consequently promoted.

As described above, the present inventors have enabled clarifying conditions for promoted formation of the protrudent intermetallic compounds that constitutes a feature of the invention.

Subsequently, machining is again used to scrape an uppermost surface portion to bring about a state, in which the bearing alloy layer 1, the soft layer 4 with the recesses 2, and the intermediate layer 3 are mixed on a sliding surface (an upper surface in FIG. 1) as shown in FIG. 1. Thus, a plain bearing is finished.

In order to confirm the advantageous effects of the invention, the present inventors have carried out cavitation tests, as indicated in the following Table 1, on invention specimen Nos. 1 to 9, which were fabricated by the method described above, and specimens of comparative specimen Nos. 1 to 3, which were fabricated by a method of the comparative specimens described later.

TABLE 1

| | | Structure | | | |
|---|---|---|---|---|---|
| | | Soft layer/ Intermediate layer | Recess Depth (μm) | Protrudent Intermetallic Compound | Cavitation test (mm³) |
| Comparative Specimen | 1 | Pb—8%Cu/Ni | 20 | No | 3.1 |
| | 2 | Sn—2%Cu/Ni | 20 | No | 1.5 |
| | 3 | Sn—10%Cu/Ni | 20 | No | 1.1 |
| Invention specimen | 1 | Sn—25%Cu/Ni | 20 | Yes | 0.7 |
| | 2 | Sn—10%Cu—15%Ag/Ni | 20 | Yes | 0.6 |
| | 3 | Sn—5%Cu/Ni | 10 | Yes | 0.2 |
| | 4 | Sn—10%Cu/Ni | 20 | Yes | 0.2 |
| | 5 | Sn—15%Cu/Ni | 30 | Yes | 0.1 |
| | 6 | Sn—10%Cu—5%Sb/Ni | 20 | Yes | 0.1 |
| | 7 | Sn—10%Cu—2%Ag/Ni | 30 | Yes | 0.1 |
| | 8 | Sn—5%Cu/Ni | 20 | Yes | 0.3 |

TABLE 1-continued

| | Soft layer/ Intermediate layer | Structure | | |
|---|---|---|---|---|
| | | Recess Depth (μm) | Protrudent Intermetallic Compound | Cavitation test (mm³) |
| 9 | Sn—10%Cu/Ni | 30 | Yes | 0.2 |

*Bearing alloy layer is made of a copper alloy (Cu—23%Pb—3%Sn).

In addition, the comparative specimen Nos. 1 to 3 are different in conditions of heat treatment after the formation of the soft layer from the invention speimens, for which comparative specimens the heat treatment was performed under the condition of 130° C.×1 Hr and in which comparative specimens there was not formed any protrudent intermetallic compounds extending like column from the intermediate layer into the soft layer. Also, the specimens, in which an area ratio of the recesses 2 to the sliding surface was 70%, were used in the tests.

In Table 1, "%" in the soft layer represents mass %. A soft layer in the comparative specimen No. 1 was made of a Pb alloy containing Cu while soft layers in the remaining comparative specimen Nos. 2 and 3, and the invention specimen Nos. 1 to 9 were made of a Sn alloy containing Cu. Also, the soft layers in the invention specimen Nos. 2 and 7 out of the invention specimen Nos. 1 to 9 contained Ag in addition to Cu, and the soft layer in the invention specimen No. 6 contained Sb.

Figure 5:
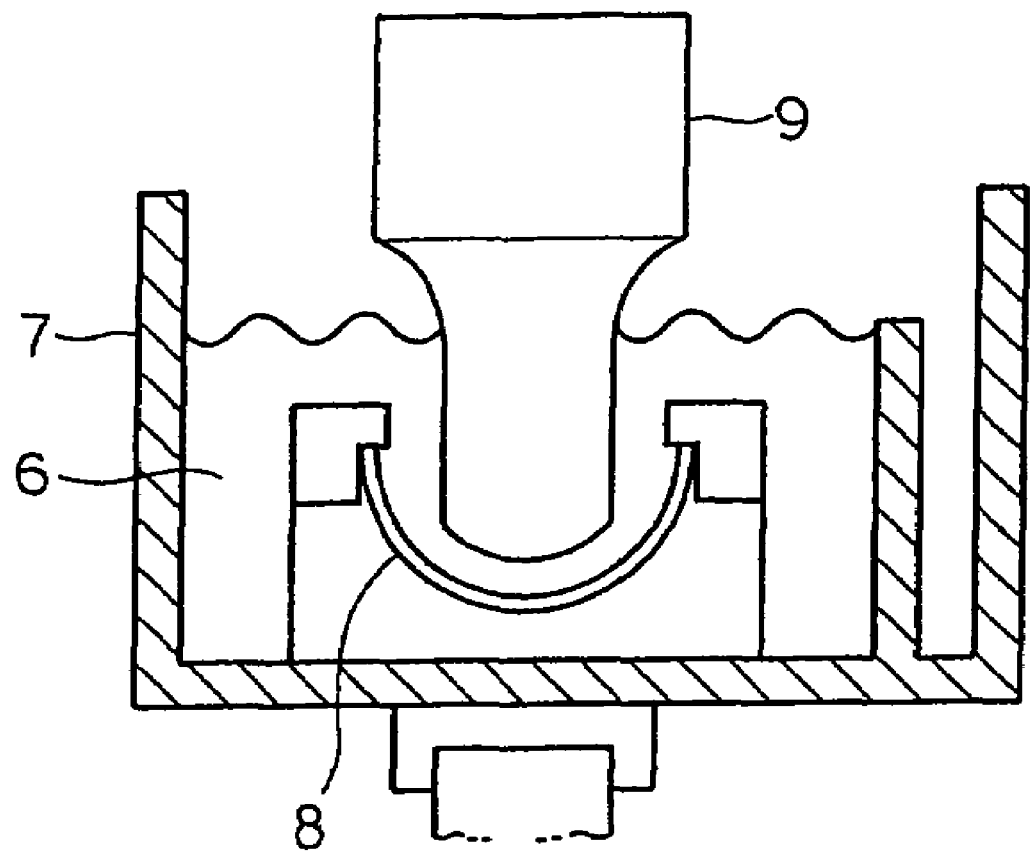
FIG. 5 is a view schematically showing the construction of a cavitation testing machine.

The cavitation tests were carried out under conditions indicated in following Table 2 with the use of a testing machine shown in FIG. 5.

TABLE 2

(Conditions of cavitation test)

| Item | Condition | Unit |
|---|---|---|
| Bearing size | 53(ϕ) × 25 (L) × 1.5 (t) | mm |
| Number of oscillation | 19,000 | Hz |
| Output | 600 | W |
| Lubricant | Water | — |
| Lubrication temperature | 10 to 20 | ° C. |
| Clearance | 0.5 | mm |
| Horn diameter | 20 (ϕ) | mm |
| Testing time | 3 | min. |

Concretely, the cavitation tests were carried out such that a test piece 8 was set in a water tank 7 with water 6 stored therein, a horn 9 for generation of supersonic waves applied supersonic waves (19000 Hz) to a sliding surface of the test piece 8 in the water for 3 minutes with a predetermined clearance (0.5 mm) therebetween, as shown in FIG. 5 and a volumetric reduction before and after the test was measured. The measured volumetric reduction is shown in the column of the cavitation test in Table 1.

As seen from Table 1, the volumetric reduction in the cavitation tests was 1.1 mm³ or more for the comparative specimen Nos. 1 to 3 while it was 0.7 mm³ or less for the invention specimen Nos. 1 to 9, and thus it could be confirmed that the invention specimen Nos. 1 to 9 were excellent in cavitation resistance. This is thought to be largely attributed to an anchoring effect produced by protrudent intermetallic compounds that extend like columns from the intermediate layer.

Further, the invention specimen Nos. 1 to 9 will be examined. While all the soft layers in specimen Nos. 1, 3 to 5, 8, 9 are made of a Sn—Cu alloy, specimen Nos. 3 to 5, 8, 9 having a Cu content of 15 mass % or less are small in volumetric reduction as compared with specimen No. 1 having a Cu content of 25 mass %. In terms of cavitation resistance, a Cu content of less than 25 mass % is preferable, 20 mass % or less is more preferable, and 5 to 15 mass % is furthermore preferable.

Also, in making a comparison between the invention specimen No. 2 and specimen No. 7, specimen No. 7 having a Ag content of 2 mass % is small in volumetric reduction as compared with specimen No. 2 having a Ag content of 15 mass %. In terms of cavitation resistance, a Ag content of less than 15 mass % is preferable, 10 mass % or less is more preferable, and 5 mass % or less is furthermore preferable.

Figure 6:
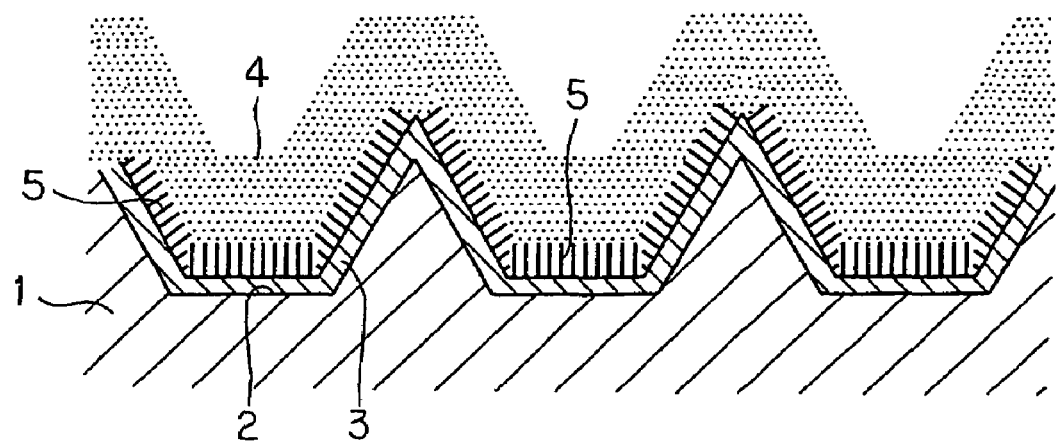
FIG. 6 is a view showing a first modification of the invention and corresponding to FIG. 1.

FIG. 6 shows a first modification of the invention that is different from the embodiment in the following point. That is, while according to the embodiment described above a structure, in which the bearing alloy layer 1, the soft layer 4 with the recesses 2, and the intermediate layer 3 are mixed on a sliding surface (an upper surface in FIG. 1), is provided by machining of the uppermost surface portion after the heat treatment, the first modification provides a structure, in which machining of the uppermost surface portion is omitted and all the surface is covered by the soft layer. This structure is effective in case of aiming at an improvement in initial conformability.

Figure 7:
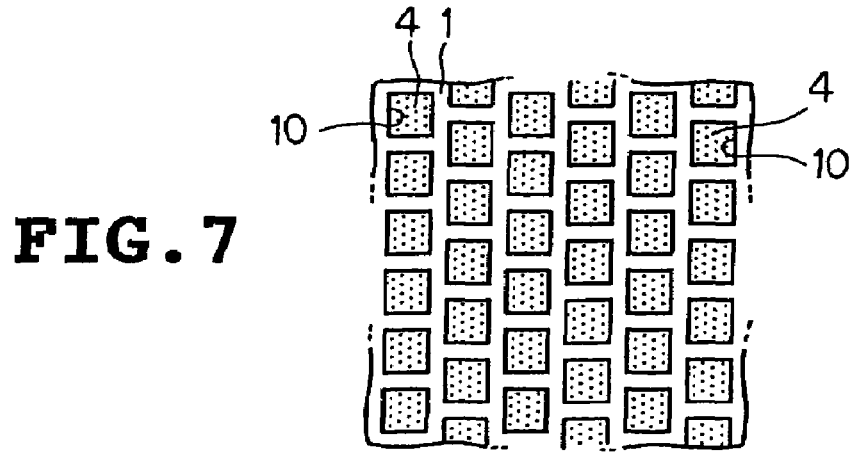
FIG. 7 is a view showing a second modification of the invention and corresponding to FIG. 3.

FIG. 7 shows a second modification of the invention that is different from the embodiment in the following point. That is, while according to the embodiment the recesses 2 are formed to be grooved, the second modification provides a structure, in which a multiplicity of recesses 10 having an independent, rectangular configuration as viewed from above are formed, an intermediate layer 3 (see FIG. 1) is provided on internal surfaces of the respective recesses 10, and a soft layer 4 is provided on the intermediate layer 3.

Figure 8:
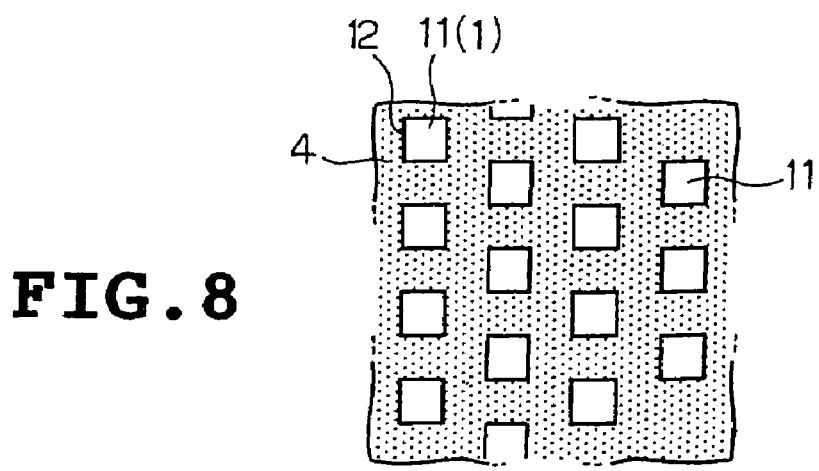
FIG. 8 is a view showing a third modification of the invention and corresponding to FIG. 3.

FIG. 8 shows a third modification of the invention that is different from the second modification described above in the following point. That is, according to the third modification, exposed portions 11 of a bearing alloy layer 1 are left in the form of a rectangle, a continuous recess 12 is formed around the exposed portions, an intermediate layer 3 (see FIG. 1) is provided on an internal surface of the recess 12, and a soft layer 4 is provided on the intermediate layer 3.

The invention is not limited to the embodiment and the first to third modifications but afford modification or extension as follows.

With a view to achieving an improvement in initial conformability, an uppermost surface layer of the order of 1 to 10 μm may be provided on an uppermost surface of a sliding surface in a plain bearing.

A method of forming recesses 2, 10, 12 can adopt, in addition to machining (boring), a chemical treatment comprised by a combination of masking and etching, a physical treatment comprised by a combination of masking and shot blasting, or laser processing.

In order to facilitate formation of the protrudent intermetallic compounds 5, the soft layer 4 can be of a double-layered plating structure such that when the soft layer 4 is provided, a Sn—Cu alloy (for example, Sn-10% Cu) having a high Cu concentration is first coated and thereafter a Sn—Cu alloy (for example, Sn-4%Cu) having a low Cu concentration is coated thereon, or the soft layer 4 can be structured to have a component inclination that is increased in Cu concentration toward the intermediate layer 3.

The invention is also applicable to other sliding members than plain bearings.

The invention claimed is:

1. A sliding member comprising a sliding alloy layer,
an intermediate layer of Ni or a Ni alloy formed on the sliding alloy layer, and
a soft layer made of a Sn alloy which contains Cu in an amount not more than 20 mass % formed on the intermediate layer,
wherein there is formed a recess on the sliding side surface of the sliding alloy layer, and
the intermediate layer, having a thickness of 1 to 5 μm, is formed on the inner surface of the recess, and
wherein there are formed intermetallic compounds in the soft layer, which extend protrudently from the intermediate layer.

2. A sliding member according to claim 1, wherein a sliding surface of the sliding member includes at least surfaces of the sliding alloy layer and the soft layer.

3. A sliding member according to claim 2, wherein the Sn alloy further contains at least one selected from the group consisting of not more than 10 mass % Ag and optionally not more than 15 mass % Sb.

4. A sliding member according to claim 3, wherein the recess formed on the sliding alloy layer has a depth of 5 to 50 μm.

5. A sliding member according to claim 2, wherein the recess formed on the sliding alloy layer has a depth of 5 to 50 μm.

6. A sliding member according to claim 1, wherein the Sn alloy further contains at least one selected from the group consisting of not more than 10 mass % Ag and not more than 15 mass % Sb.

7. A sliding member according to claim 6, wherein the recess formed on the sliding alloy layer has a depth of 5 to 50 μm.

8. A sliding member according to claim 1, wherein the recess formed on the sliding alloy layer has a depth of 5 to 50 μm.

9. A sliding member according to claim 1, wherein the protrudently extending intermetallic compounds comprises at least Sn—Cu—Ni.

10. A sliding member according to claim 1, wherein a Cu concentration of the soft layer close to the intermediate layer is higher than that of the other region of the soft layer.

11. A sliding member according to claim 10, wherein the difference of the Cu concentration between a position close to the intermediate layer and the other position has been realized by a double-layered plating structure.

12. A sliding member according to claim 10, wherein the difference of the Cu concentration between a position close to the intermediate layer and the other position has been realized by providing the soft layer with a Cu component gradient such that the Cu concentration increases toward the intermediate layer.

13. A sliding member according to claim 10, wherein the difference of the Cu concentration between a position close to the intermediate layer and the other position is about 6 mass %.

14. A sliding member according to claim 10, wherein an area ratio of the recess to the sliding surface of the sliding member is about 70%.

15. A sliding member according to claim 1 wherein an area ratio of the recess to the sliding surface of the sliding member is about 70%.

* * * * *

UNITED STATES PATENT AND TRADEMARK OFFICE
CERTIFICATE OF CORRECTION

PATENT NO. : 7,431,507 B2  Page 1 of 1
APPLICATION NO. : 10/862359
DATED : October 7, 2008
INVENTOR(S) : Tsuji et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 694 days Delete the phrase "by 694 days" and insert -- by 1095 days --

Signed and Sealed this

Twenty-seventh Day of April, 2010

David J. Kappos
*Director of the United States Patent and Trademark Office*